United States Patent
Lee et al.

(10) Patent No.: US 9,973,911 B2
(45) Date of Patent: May 15, 2018

(54) METHOD OF OPERATING AVN, AVN, AND VEHICLE INCLUDING THE SAME

(71) Applicant: HYUNDAI MOTOR COMPANY, Seoul (KR)

(72) Inventors: Ki Ra Lee, Yongin-si (KR); Seong Jin Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/357,381

(22) Filed: Nov. 21, 2016

(65) Prior Publication Data
US 2017/0171734 A1 Jun. 15, 2017

(30) Foreign Application Priority Data
Dec. 9, 2015 (KR) ......... 10-2015-0175071

(51) Int. Cl.
| | |
|---|---|
| *H04W 4/22* | (2009.01) |
| *H04W 4/00* | (2018.01) |
| *H04L 29/08* | (2006.01) |
| *B60R 21/00* | (2006.01) |
| *H04M 1/60* | (2006.01) |
| *H04M 1/725* | (2006.01) |

(52) U.S. Cl.
CPC .............. *H04W 4/22* (2013.01); *B60R 21/00* (2013.01); *H04L 67/12* (2013.01); *H04M 1/6083* (2013.01); *H04M 1/72538* (2013.01); *H04W 4/008* (2013.01); *B60R 2021/0027* (2013.01)

(58) Field of Classification Search
CPC ......... H04W 4/22; H04W 8/24; H04W 84/12; H04W 72/06; H04W 4/008; H04M 3/5116; H04M 9/082; H04M 1/72538; G05D 1/0011; H04L 47/10; H04L 47/14; H04L 47/36; H04L 67/12
See application file for complete search history.

(56) References Cited

U.S. PATENT DOCUMENTS

| | | | |
|---|---|---|---|
| 7,289,024 B2 | 10/2007 | Sumcad et al. | |
| 9,432,828 B1* | 8/2016 | Tu | ............... H04W 4/22 |
| 2005/0203746 A1* | 9/2005 | Obata | .............. G10L 25/78 |
| | | | 704/270 |
| 2016/0029197 A1* | 1/2016 | Gellens | ........... G05D 1/0011 |
| | | | 455/404.1 |

FOREIGN PATENT DOCUMENTS

| | | |
|---|---|---|
| JP | 11-069456 A | 3/1999 |
| JP | 2000-216916 A | 8/2000 |
| JP | 2004-050898 A | 2/2004 |

(Continued)

*Primary Examiner* — Nizar Sivji
(74) *Attorney, Agent, or Firm* — McDermott Will & Emery LLP

(57) ABSTRACT

A method of operating audio, video, navigation (AVN), an AVN, and a vehicle including the same are disclosed. The method includes determining whether a vehicle speaker and a vehicle microphone connected to the AVN is abnormal when a car accident occurs, releasing pairing with a paired terminal and performing role change of changing the terminal to a hands-free unit (HF) when at least one of the vehicle speaker and the vehicle microphone is abnormal, and performing voice call using a speaker and microphone of the terminal.

20 Claims, 4 Drawing Sheets

(56) References Cited

FOREIGN PATENT DOCUMENTS

| | | | |
|---|---|---|---|
| JP | 2008-273463 | A | 11/2008 |
| JP | 2009-110062 | A | 5/2009 |
| JP | 2013-055545 | A | 3/2013 |
| JP | 2013055545 | A * | 3/2013 |
| JP | 2015-158733 | A | 9/2015 |
| KR | 10-2014-0059933 | A | 5/2014 |

* cited by examiner

METHOD OF OPERATING AVN, AVN, AND VEHICLE INCLUDING THE SAME

CROSS-REFERENCE TO RELATED APPLICATIONS

This application claims the benefit of Korean Patent Application No. 10-2015-0175071, filed on Dec. 9, 2015, which is hereby incorporated by reference as if fully set forth herein.

TECHNICAL FIELD

The present invention relates to a method of operating audio, video, navigation (AVN), an AVN, and a vehicle including the same, and more particularly, to a method of operating an AVN for providing an SOS service, an AVN, and a vehicle including the same.

BACKGROUND

An audio, video, navigation (AVN) system is a vehicle multimedia system in which an audio system, a video system, and a navigation system are integrated in the form of one unit. By virtue of development of the AVN system, a user can enjoy convenience in manipulating various multimedia apparatuses and can effectively use an internal space of a vehicle.

Recently introduced vehicles have various convenience systems for facilitating safe driving of a driver. When a dangerous situation is predicted, the convenience system audibly or visually warns a driver of the dangerous situation and, when a dangerous situation occurs, the convenience system automatically copes with the situation so as to facilitate safe driving of a driver.

When a car accident occurs, the car automatically or manually transmits information on a current location of the car, a gyro sensor value, whether an air bag is deployed, etc. to an emergency or rescue center and a driver actually speaks over a telephone with an adviser of the center using a speaker or microphone in the vehicle so as to recognize a current accident situation and to rapidly cope with the accident. This service is referred to as an SOS service.

However, an exterior amplifier, a digital voice output port (e.g., Sony/Philips digital interface (SPDIF)), media oriented systems transport (MOST), a controller area network (CAN) communication line, etc. for telephone conversation as well as a speaker can be damaged due to a car accident. Accordingly, the speaker in the vehicle cannot be operated during telephone conversation with an adviser who provides the SOS service, but the call-connected adviser cannot check an actual sound output state of the vehicle and normal telephone conversation is frequently impossible.

SUMMARY

Accordingly, the present disclosure is directed to a method of operating an audio, video, navigation (AVN), an AVN, and a vehicle including the same that substantially obviates one or more problems due to limitations and disadvantages of the related art.

An object of the present disclosure is to provide a method of operating an audio, video, navigation (AVN), an AVN, and a vehicle including the same, for normal voice call with an adviser of a telematics center in an emergency situation such as a car accident.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of operating an audio, video, navigation (AVN) includes determining whether a vehicle speaker and a vehicle microphone connected to the AVN are abnormal when a car accident occurs, releasing pairing with a paired terminal and performing role change of changing the terminal to a hands-free unit (HF) when at least one of the vehicle speaker and the vehicle microphone is abnormal, and performing voice call using a speaker and microphone of the terminal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. In addition, the suffixes "module" and "unit" of elements herein are used for convenience of description and thus can be used interchangeably and do not have any distinguishable meanings or functions.

Figure 1:
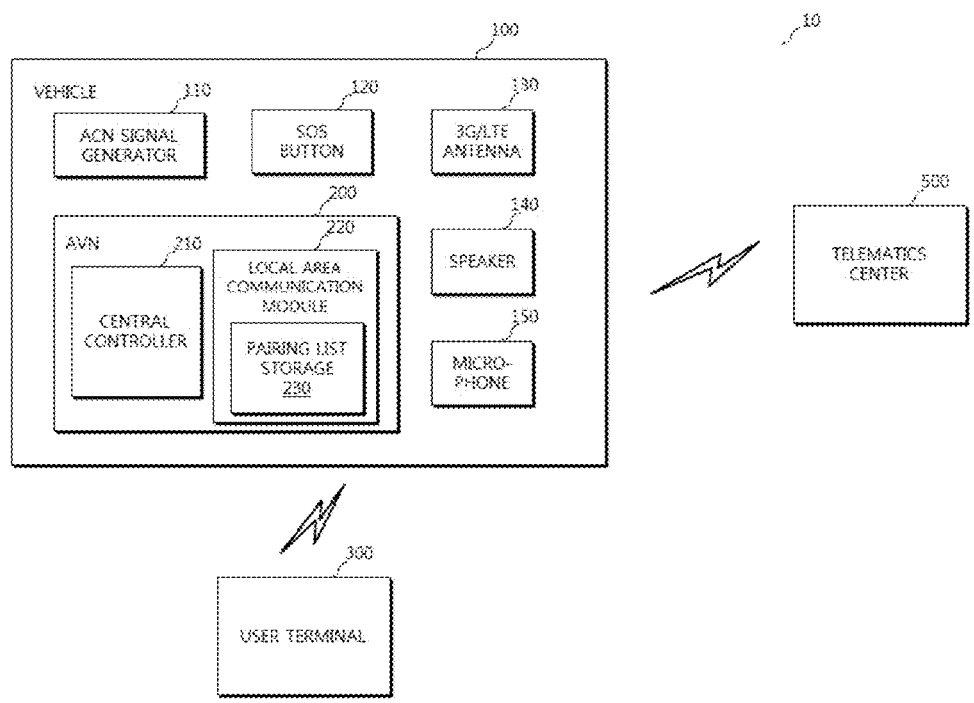
FIG. 1 is a block diagram illustrating an SOS service system according to an embodiment of the present disclosure.
Figure 2:
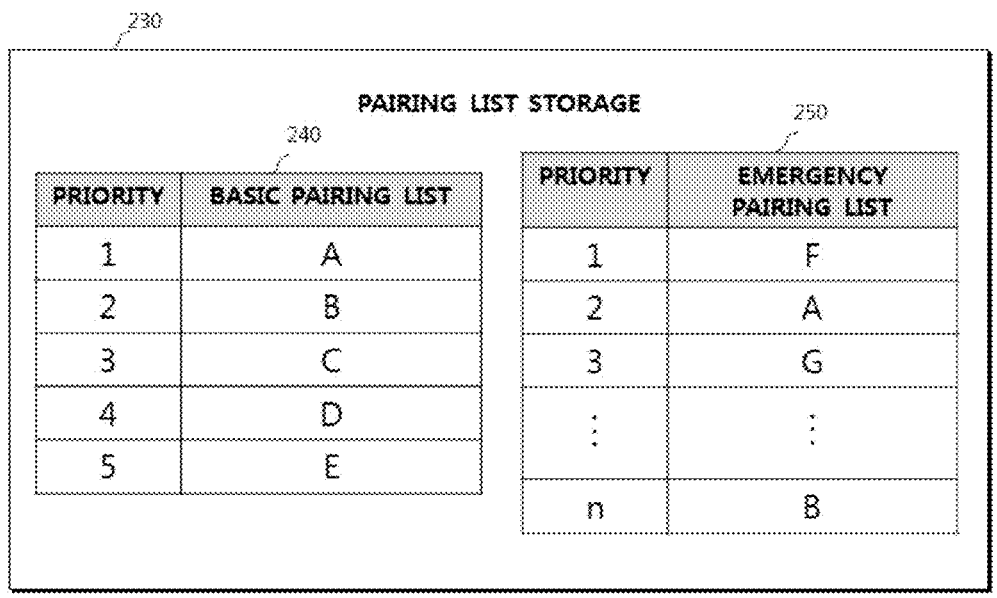
FIG. 2 is a block diagram illustrating pairing lists stored in a pairing list storage illustrated in FIG. 1.

FIG. 1 is a block diagram illustrating an SOS service system 10 according to an embodiment of the present disclosure. FIG. 2 is a block diagram illustrating pairing lists stored in a pairing list storage illustrated in FIG. 1.

Referring to FIGS. 1 and 2, the SOS service system 10 may provide an SOS service. According to the SOS service, when a car accident occurs, the car automatically or manually transmits information on a current location of the car, a gyro sensor value, whether an air bag is deployed, etc. to a telematics center 500 and a driver actually speaks over a telephone with an adviser of the center so as to recognize a current accident situation and to rapidly cope with the accident.

The SOS service system 10 may include a vehicle 100, a user terminal 300, and the telematics center 500.

The vehicle 100 may include an automatic crash notification (ACN) signal generator 110, an SOS button 120, a 3G/LTE (here, the expression "/" means that the terminologies separated by "/" may be used simultaneously or alternatively) antenna 130, a speaker 140, a microphone 150, and an audio, video, navigation (AVN) 200. Here, components included in the vehicle 100 may exchange signals through a digital voice output port (e.g., Sony/Philips digital interface (SPDIF)), media oriented systems transport (MOST), a controller area network (CAN) communication line, etc.

The ACN signal generator 110 may detect whether an accident of the vehicle 100 occurs and generate an ACN signal indicating that the accident occurs and transmit the ACN signal to the AVN 200 upon detection that an accident of the vehicle 100 occurs. For example, the ACN signal generator 110 may be embodied as an airbag control unit (ACU) that controls the airbag to be operated, generates an airbag deployment signal, and transmits the airbag deployment signal to the AVN 200 for driver and passenger safety when impact of a threshold value or more is detected through an impact detection sensor installed at a specific position of the vehicle 100. Here, the airbag deployment signal may correspond to the ACN signal.

The SOS button 120 may be a manipulation button that is embodied to be manipulated by a person seated in the vehicle, such as a driver or a passenger, and may generate an SOS signal that performs the same function as the ACN signal and may transmit the SOS signal to the AVN 200 when the SOS button 120 is pushed by a user.

The 3G/LTE antenna 130 may be a device that relays data transmission and reception between the AVN 200 and a mobile communication network using a $3^{rd}$ generation (3G) or a long-term evolution (LTE) method.

The speaker 140 and the microphone 150 may be a vehicle speaker and a vehicle microphone, respectively and may perform an input/output function of an audio signal for a multimedia function (music, radio, DMB, and navigation guidance) of the AVN 200. In addition, the speaker 140 and the microphone 150 may perform the input/output function of an audio signal during telephone conversation with an adviser provided by an SOS service.

The speaker 140 may include an exterior amplifier for amplification of an audio signal, receive a digital audio signal from the AVN 200, and perform digital-analog conversion and noise removal to output an analog audio signal.

The microphone 150 may receive an audio signal in the vehicle 100 and perform analog-digital conversion and noise removal to output a digital audio signal to the AVN 200.

The AVN 200 may be a vehicle multimedia system in which an audio system, a video system, and a navigation system are integrated in the form of one unit. In addition, the AVN 200 may perform a main control function for an SOS service when an accident of the vehicle 100 occurs.

The AVN 200 may include a central controller 210 and a local area communication module 220.

The central controller 210 may control an overall operation of the AVN 200 and communicate with internal and external portions of the vehicle 100 for operations of the audio system, the video system, and the navigation system. In addition, the central controller 210 may execute programs for functions of the audio system, the video system, and the navigation system to check states of peripheral circuits (e.g., the speaker 140, the microphone 150, a display module, a touchscreen module, and the local area communication module 220) for these functions.

In particular, upon receiving the ACN signal from the ACN signal generator 110 or the SOS signal from the SOS button 120, the central controller 210 may recognize that an accident of the vehicle 100 occurs, generate an emergency rescue message, and transmit the emergency rescue message to the telematics center 500 through the 3G/LTE antenna 130. In addition, the central controller 210 may perform a procedure for normal voice call with an adviser of the telematics center 500. Here, the procedure will be described below with reference to FIGS. 3 and 4.

The emergency rescue message may include vehicle state information on a vehicle number and a current location of the vehicle 100, a terminal telephone number of the AVN 200, a gyro sensor value, whether an airbag is deployed, etc. and audio state information on whether speakers/microphones of the vehicle 100 and a terminal (a UE to be paired or peripheral terminal to be described later).

The local area communication module 220 may transmit and receive data to and from a device (e.g., the user terminal 300) using a local area communication method such as Bluetooth, Wi-Fi, or near field communication (NFC) under control of the central controller 210.

The local area communication module 220 may include a pairing list storage 230 that may be embodied as a non-volatile memory.

The pairing list storage 230 may store a list of devices to be paired using a Bluetooth method. Pairing may refer to a procedure for respectively allocating communication channel to two devices connected to each other using a Bluetooth method, performing authentication, and connecting the devices so as to transmit and receive data.

As illustrated in FIG. 2, the pairing list storage 230 may store a basic pairing list 240 and an emergency pairing list 250.

The basic pairing list 240 may be a list of devices that have been paired and registered by a user who uses the AVN 200 and may be stored according to priority registered by the user. In the example of FIG. 2, the basic pairing list 240 may store a list of five devices and store device information items A to E that correspond to first to fifth priorities, respectively. The information items A to E may include information (e.g., the type, ID, class, MAC address, and telephone number of a corresponding device) required to perform forcible pairing with a corresponding device. According to an embodiment of the present disclosure, the basic pairing list 240 may provide registration of five apparatuses, without being limited thereto.

According to another embodiment of the present disclosure, priority of the basic pairing list 240 may be determined in a such a way that first priority corresponds to a terminal set with first priority by a user, second priority corresponds to a most recently paired terminal, and third priority and subsequent priorities are determined according to a registration order.

The emergency pairing list 250 may be a list of devices that were paired in the past and are stored in order to compensate for the basic pairing list 240 during emergency call according to an SOS service and may be stored according to priority. The priority may be determined according to a specific reference. According to an embodiment of the present disclosure but not limited thereto, the priority may be determined from a close pairing time point to a current time point. That is, a device corresponding to device information F of first priority is a most recently paired device, and devices corresponding to second priority and third priority are subsequently paired devices.

In addition, the emergency pairing list 250 may store device information items up to n (n being an integer equal to or greater than 1). In some embodiments, n may be the number of devices that have been paired with the AVN 200 at least once.

The user terminal 300 may be embodied as a cellular phone, a smartphone, a wearable device such as a smartwatch, a notebook computer, and so on and, may include a mobile communication module that communicates with an external server (e.g., 500) through a mobile communication network and a local area communication module that performs local area communication with the vehicle 100. In addition, the user terminal 300 may provide a speaker and a microphone so as to provide voice call. The user terminal 300 may refer to a Bluetooth-paired terminal to be described later or a peripheral terminal.

The telematics center 500 may provide a telematics service. The telematics service may provide a navigation function, various multimedia functions such as burglar alarm, SOS, remote diagnosis, consumables management, a hands-free mobile telephone, living information, personal information, a secretary service, and Internet access, an interactive Internet service, and a mobile service using an AVN terminal.

The telematics center 500 may manage service opening of the AVN 200 installed in the vehicle 100 and collect information required by a user and transmit the information to the AVN 200 installed in the vehicle 100 or transmit information collected from a terminal installed in the vehicle 100 to a communication network provider or a corresponding organization (e.g., an insurance company or an emergency rescue center).

In particular, when an accident of the vehicle 100 occurs, the telematics center 500 may receive the emergency rescue message transmitted from the AVN 200 so as to approximate a current state of the vehicle 100 such that an adviser may rapidly/accurately take required measures through voice call with a driver or passenger of the accident vehicle.

The telematics center 500 may manage a database (DB) for storing and managing vehicle information of the vehicle 100, information of the AVN 200, map data, firmware upgrade information of the AVN 200, etc. inside or outside the center.

Figure 3:
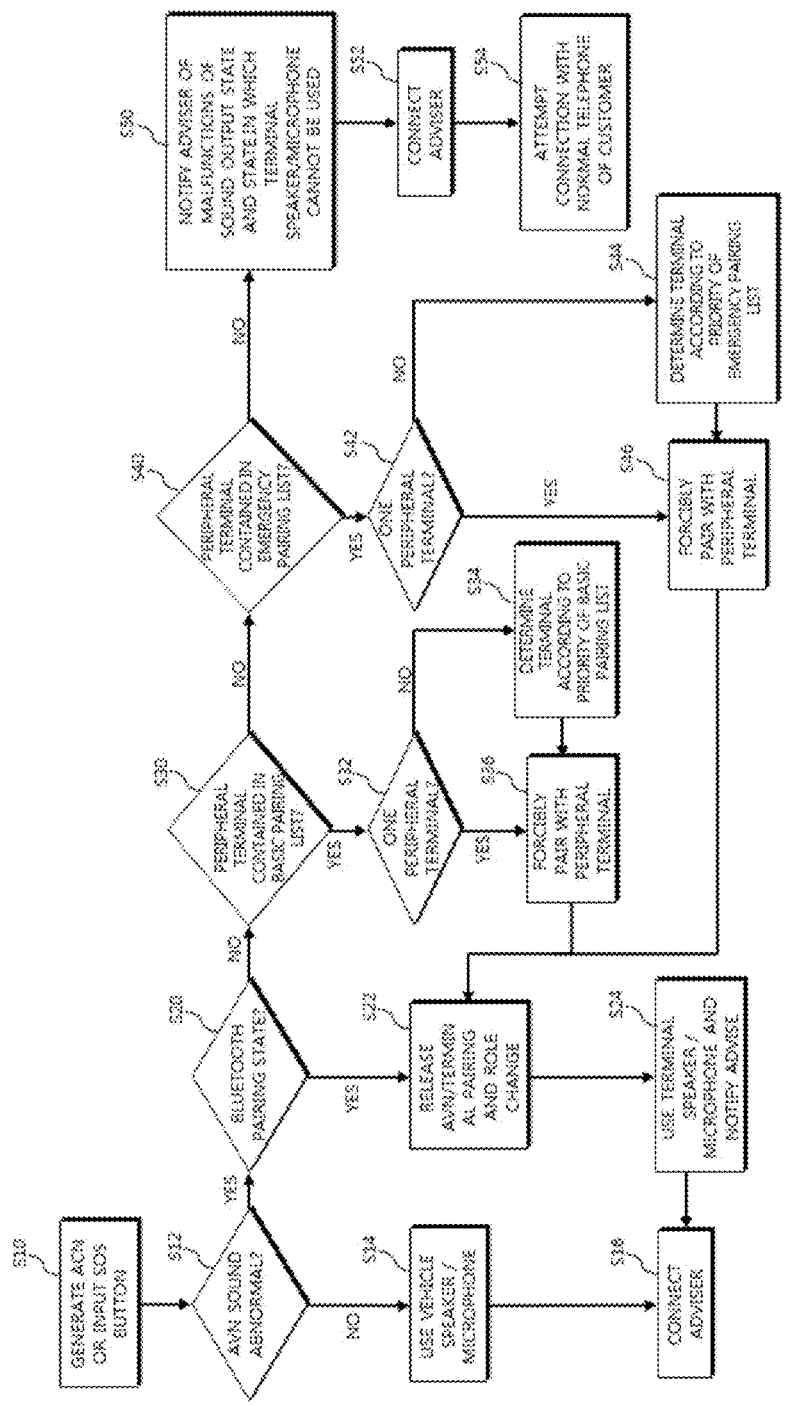
FIG. 3 is a flowchart of a method of operating an AVN according to an embodiment of the present disclosure.
Figure 4:
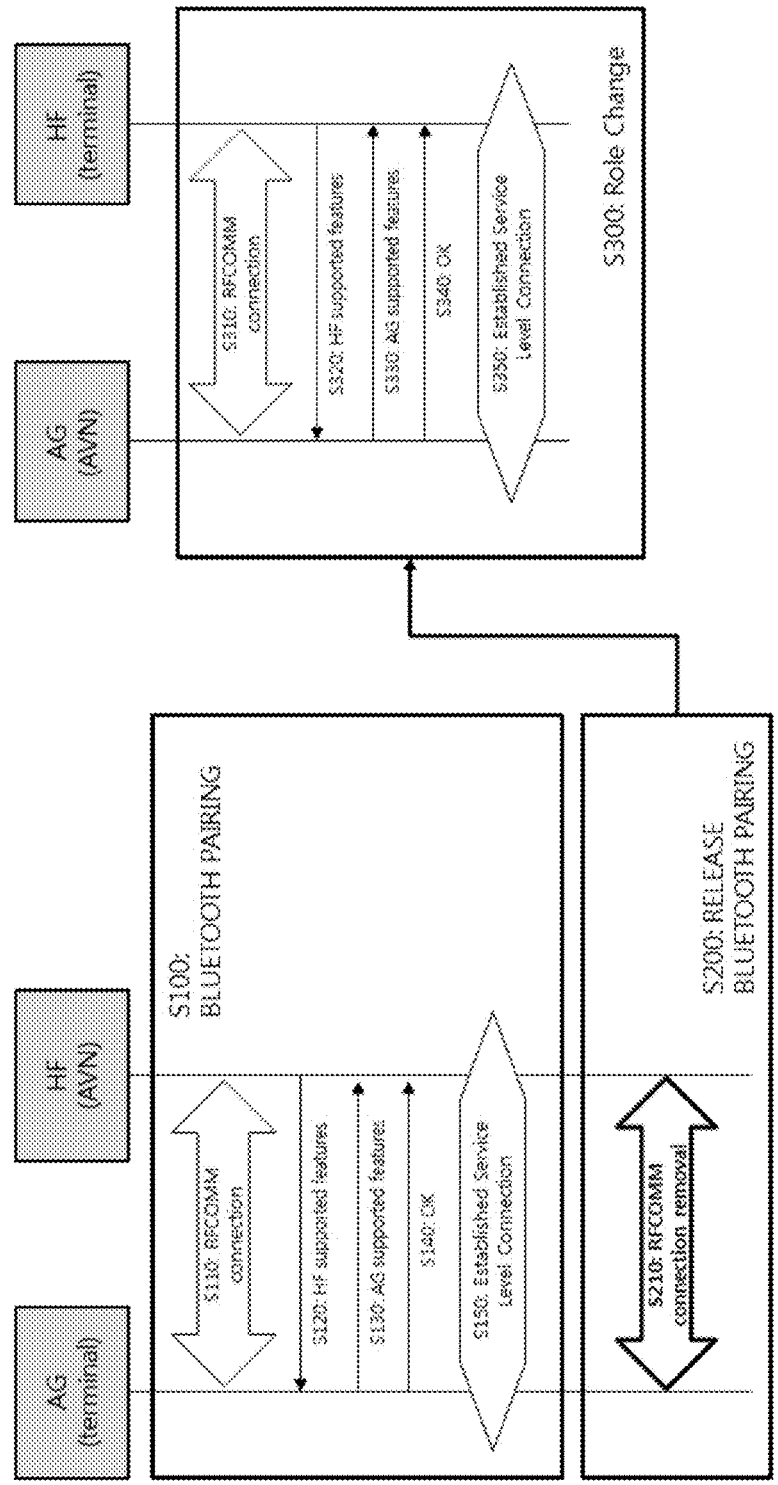
FIG. 4 is a flowchart for explanation of step S22 illustrated in FIG. 3.

FIG. 3 is a flowchart of a method of operating an AVN according to an embodiment of the present disclosure. FIG. 4 is a flowchart for explanation of step S22 illustrated in FIG. 3.

Referring to FIGS. 1 to 4, when an accident of the vehicle 100 occurs, an ACN signal of the ACN signal generator 110 or an SOS signal of the SOS button 120 may be input to the central controller 210 of the AVN 200 (S10).

Upon receiving at least one of the ACN signal and the SOS signal, the central controller 210 may check states of the speaker 140 and the microphone 150 that are connected to the AVN 200 (S12). Here, the states of the speaker 140 and the microphone 150 may be checked by, for example, checking whether disconnection occurs or outputting a sound source at an arbitrary frequency to the speaker 140, receiving the sound source by the microphone 150, and transmitting the sound source to the central controller 210, without being limited thereto.

As the check result of the states of the speaker 140 and the microphone 150, when both the speaker 140 and the microphone 150 are normal (NO of S12), the central controller 210 may use the speaker 140 and the microphone 150 to connect voice call with an adviser of the telematics center 500 (S14). In addition, the central controller 210 may add information (e.g., 0 as a predetermined code) indicating that the speaker 140 and the microphone 150 of the vehicle 100 are normal to the audio state information of the emergency rescue message.

Then, voice call may be performed between the adviser and a person positioned in the vehicle 100 through a voice call process between the telematics center 500 and the AVN 200 (S16).

On the other hand, as the check result of the states of the speaker 140 and the microphone 150, when at least one of the speaker 140 and the microphone 150 is abnormal (YES of S12), the central controller 210 may determine whether a terminal paired with the local area communication module 220 is currently present (S20). Hereinafter, the pairing may refer to Bluetooth pairing as an example.

When a terminal that is already and normally paired with the local area communication module 220 is present (YES of S20), the central controller 210 may control the local area communication module 220 to release pairing between the local area communication module 220 and the terminal and to perform role change between the local area communication module 220 and the terminal (S22).

Two devices that are paired with each other using a Bluetooth method may be classified into an audio gateway (hereinafter, referred to as "AG") and a hands-free unit (hereinafter, referred to as "HF") according to respective functions. The AG may refer to a device that substantially handles audio output and input and the HF may refer to a remote input and output control device of the AG. With respect to an example in which voice call is performed using a Bluetooth earphone and a smartphone, the smartphone that is connected to a mobile communication network, provides an external voice signal to the Bluetooth earphone, and receives and processes a voice signal may be an AG and the Bluetooth earphone that operates as a remote speaker and microphone of the smartphone may be an HF.

That is, when the local area communication module 220 and the terminal are paired with each other in a normal state in the vehicle 100, the terminal and the AVN 200 may operate as an AG and an HF, respectively so as to perform voice call connected by the terminal using the speaker 140 and the microphone 150 of the AVN 200.

However, when the speaker 140 and the microphone 150 are currently abnormal, voice call through the speaker 140 and the microphone 150 is impossible, and thus a setting in which the terminal with a normal speaker and microphone operates as an HF and the AVN 200 capable of performing a voice call process with an independent telephone number operates as an AG may be required, which is referred to as role change.

That is, the role change may refer to an operation of exchanging functions of the AG and the HF with each other.

FIG. 4 illustrates steps S100, S200, and S300. Step S100 may be Bluetooth pairing performed prior to an accident of the vehicle 100 or forcible pairing of S36 or S46 that will be described later.

Steps S200 and S300 may refer to step S22.

In FIG. 4, subsequent operations of the AVN 200 may be performed by the local area communication module 220 of the AVN 200.

Step S100 will now be described. The terminal as an AG and the AVN 200 as an HF may establish an RFCOMM data link channel as a virtual serial port through which data and a control signal are transmitted and received (S110).

The AVN 200 as an HF may transmit HF supported features about a function supported by the AVN 200 to the terminal as an AG through the channel (S120).

For example, the supported features may include an audio output function (speaker) and an audio input function (microphone).

The terminal as an AG may receive the supported features and transmit AG supported features to the AVN 200 as an HF (S130).

In addition, when all functions to be allocated to the HF are contained in the supported features, the terminal as an AG may transmit an acknowledgement signal (OK) (S140). The functions to be allocated to the HF may be set to a default, without being limited thereto.

When acknowledgement between the terminal as an AG and the AVN 200 as an HF is completed, the terminal as an AG and the AVN 200 as an HF may perform synchronization so as to transmit and receive a data signal (e.g., an audio signal) for a function to be allocated to the HF so as to establish service level connection (S150).

Step S200 will now be described. The AVN 200 may release the RFCOMM data link channel established between the terminal as an AG and the AVN 200 as an HF (S210) in order to perform role change of step S300 because an AG and an HF are determined while the RFCOMM data link channel is established.

Step S300 will now be described. The AVN 200 as an AG and the terminal as an HF may establish a new channel (RFCOMM data link channel) as a virtual serial port through which data and a control signal are transmitted and received (S310).

The terminal as an HF may transmit HF supported features about a function supported by the terminal to the AVN 200 through the channel (S320).

For example, the supported features may include an audio output function (speaker) and an audio input function (microphone).

The AVN 200 as an AG may receive the supported features and transmit AG supported features to the terminal as an HF (S330).

In addition, when all functions to be allocated to the HF are contained in the supported features, the AVN 200 as an AG may transmit an acknowledgement signal (OK) (S340). The functions to be allocated to the HF may include an audio output function (speaker) and an audio input function (microphone).

When acknowledgement between the AVN 200 as an AG and the terminal as an HF is completed, the AVN 200 as an AG and the terminal as an HF may perform synchronization so as to transmit and receive an audio signal for a function to be allocated to the HF so as to establish new protocol connection (service level connection) (S350).

Accordingly, role change for enabling voice call between the AVN 200 and the telematics center 500 through a speaker and a microphone of the terminal as an HF may be completed.

Thus, the speaker and microphone of the terminal as an HF may be used in voice call connection with an adviser of the telematics center 500, and the central controller 210 may add information (e.g., 1 as a predetermined code) indicating that voice call is performed through a terminal that is currently Bluetooth-connected to due to failure of the speaker 140 and the microphone 150 of the vehicle 100 to the audio state information of the emergency rescue message (S24). The adviser of the telematics center 500 may recognize that voice call is being performed through a speaker and microphone of a terminal with lower performance than the speaker 140 and the microphone 150 of the vehicle 100, through the code, and thus call with louder voice than a normal state may be guided so as to accurately transmit expression of an emergency situation in a subsequent step S16.

In addition, when an application (e.g., a Bluetooth application) provided by the telematics center 500 is pre-installed in the terminal as an HF, a current mode may be automatically converted into a speaker mode (e.g., speaker call) so as to perform call during call connection with the adviser of the telematics center 500.

When a terminal to be paired with the local area communication module 220 is not present (NO of S20), the local area communication module 220 may determine whether a terminal (hereinafter, referred to as "peripheral terminal") from which a discovery signal is detected is contained in the basic pairing list 240 of the pairing list storage 230 (S30).

When the peripheral terminal is contained in the basic pairing list 240 (YES of S30), the local area communication module 220 may determine whether one peripheral terminal is present (S32).

When a plurality of peripheral terminals are present (NO of S32), the local area communication module 220 may determine a terminal with highest priority among priorities set in the basic pairing list 240 as a target of forcible pairing (S34). This is because success probability of forcible pairing is enhanced as priority of a terminal is higher in the basic pairing list 240 compared with the case in which a user directly sets priority.

When the number of terminals with highest priority among priorities set in the basic pairing list 240 or the number of peripheral terminals is one (YES of S32), the local area communication module 220 may perform forcible pairing with the peripheral terminal (S36). Here, when forcible pairing with a terminal with highest priority among priorities set in the basic pairing list 240 fails, forcible pairing may be sequentially performed on terminals with lower priorities.

The forcible pairing may be materially the same as step S100 of FIG. 4 as described above, and thus a detailed description thereof will be omitted. Then, steps S22, S24, and S16 may be performed.

When the peripheral terminal is not contained in the basic pairing list 240 (NO of S30), the local area communication module 220 may determine whether the peripheral terminal is contained in the emergency pairing list 250 of the pairing list storage 230 (S40). Here, whether the peripheral terminal is contained may be determined previously with respect to the basic pairing list 240 compared with the emergency pairing list 250, without being limited thereto, and whether the peripheral terminal is contained may be determined previously with respect to the emergency pairing list 250 compared with the basic pairing list 240.

Whether the peripheral terminal is contained in the emergency pairing list 250 may be periodically determined so as to further enhance success probability of forcible pairing.

When the peripheral terminal is contained in the emergency pairing list 250 (YES of S40), the local area communication module 220 may determine whether one peripheral terminal is present (S42).

When a plurality of peripheral terminals are present (NO of S42), the local area communication module 220 may determine a terminal with highest priority among priorities set in the emergency pairing list 250 as a target of forcible pairing (S44). This is because success probability of forcible pairing is enhanced as a terminal is more recently paired when terminals of the emergency pairing list 250 are aligned in a pairing order.

When the number of terminals with highest priority among priorities stored in the emergency pairing list 250 or the number of peripheral terminals is one (YES of S42), the local area communication module 220 may perform forcible pairing with the peripheral terminal (S46). Here, when forcible pairing with a terminal with highest priority among priorities stored in the emergency pairing list 250 fails, forcible pairing may be sequentially performed on terminals with lower priorities.

The forcible pairing may be materially the same as step S100 of FIG. 4 as described above, and thus a detailed description thereof will be omitted. Then, steps S22, S24, and S16 may be performed.

When the peripheral terminal is not contained in the emergency pairing list 250 (YES of S40), the speaker 140 and the microphone 150 of the current vehicle 100 cannot be used, and a terminal that can use a speaker and a microphone instead through forcible pairing and role change may not be present. Accordingly, the central controller 210 may add information (e.g., 2 as a predetermined code) indicating that a sound output state of the vehicle 100 of the audio state information malfunctions and a speaker and microphone of a peripheral terminal cannot be used because a paired terminal or a terminal to be paired is not present as well as the vehicle state information, to the emergency rescue message (S50).

An adviser of the telematics center 500 may recognize that normal call is impossible during voice call connection with the AVN 200 from the emergency rescue message and attempt connection to a customer telephone number (a normal telephone number) corresponding to a car number contained in the vehicle state information without delay (S52 and S54).

According to an embodiment of the present disclosure, a method of operating the AVN 200, the AVN 200, and the vehicle 100 including the same may enable normal voice call with an adviser of a telematics center using a speaker and a microphone of a terminal even when an audio system of a vehicle cannot be used during an emergency situation such as a car accident.

Audio state information on whether an audio system of a vehicle is used, whether a speaker and a microphone of a terminal are used, and so on may be transmitted to a telematics such that an adviser can select a voice call method appropriate for the audio state information so as to rapidly cope with the accident.

As is apparent from the above description, according to an embodiment of the present disclosure, a method of operating an AVN, an AVN, and a vehicle including the same may enable normal voice call with an adviser of a telematics center using a speaker and a microphone of a terminal even when an audio system of a vehicle cannot be used during an emergency situation such as a car accident.

Audio state information on whether an audio system of a vehicle is used, whether a speaker and a microphone of a terminal are used, and so on may be transmitted to a telematics such that an adviser can select a voice call method appropriate for the audio state information so as to rapidly cope with the accident.

In the above description, "normal" may mean that some element is operational, and "abnormal" may mean that some element is not operational.

The aforementioned method of operating the AVN 200 can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), magnetic tape, magnetic disk, flash memory, optical data storage devices, etc. The computer readable recording medium can also be distributed over network coupled computer systems so that the computer readable code is stored and executed in a distributed fashion. The aforementioned method of operating the AVN 200 may be implemented with execution of the stored computer readable code by the central controller 210 such as a processor or a microprocessor.

Accordingly, the above detailed description is not intended to be construed to limit the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. A method of operating an audio, video, navigation (AVN), the method comprising:
   determining whether a vehicle speaker and a vehicle microphone connected to the AVN are operational when a car accident occurs;
   releasing pairing with a paired terminal and performing role change of changing the terminal to a hands-free unit (HF) when at least one of the vehicle speaker and the vehicle microphone is not operational; and
   performing, by the AVN, voice call using a speaker and microphone of the terminal after the role change is completed,
   wherein the role change is an operation of exchanging functions of the AVN and the terminal with each other such that the AVN operates as an audio gateway (AG) and the terminal operates as the HF.

2. The method according to claim 1, further comprising receiving an automatic crash notification (ACN) signal or an SOS (save or ship) signal to detect whether the car accident occurs.

3. The method according to claim 1, further comprising determining whether a terminal Bluetooth-paired with the AVN is present when the at least one of the vehicle speaker and the vehicle microphone is not operational,
   wherein the pairing is released and performing the role change when the paired terminal is present.

4. The method according to claim 3, further comprising:
   determining whether a peripheral terminal from which a discovery signal is detected is contained in a basic pairing list when the paired terminal is not present; and
   performing forcible pairing with the peripheral terminal when the peripheral terminal is contained in the basic pairing list.

5. The method according to claim 4, wherein the peripheral terminal on which the forcible pairing is to be performed is determined according to priority of the basic pairing list when a plurality of peripheral terminals are contained in the basic pairing list.

6. The method according to claim 4, further comprising:
   determining whether the peripheral terminal is contained in an emergency pairing list when the peripheral terminal is not contained in the basic pairing list; and
   performing forcible pairing with the peripheral terminal when the peripheral terminal is contained in the emergency pairing list.

7. The method according to claim 6, wherein the peripheral terminal on which the forcible pairing is to be performed is determined according to priority of the emergency pairing list when a plurality of peripheral terminals are contained in the emergency pairing list.

8. The method according to claim 6, further comprising transmitting, to a telematics center, information indicating that the speakers and the microphones of the vehicle and the peripheral terminal are not available to be used when the peripheral terminal is not contained in the emergency pairing list.

9. The method according to claim 1, further comprising, after the performing of the role change, transmitting, to a telematics center, information indicating that voice call is performed through the speaker and the microphone of the terminal.

10. An audio, video, navigation (AVN) for providing an SOS save our ship) service, the AVN comprising:
    a central controller for determining whether a vehicle speaker and a vehicle microphone connected to the AVN is operational upon a detection that a car accident occurs; and
    a local area communication module for releasing pairing with a paired terminal and performing role change of changing the terminal to a hands-free unit (HF) in response to a determination that at least one of the vehicle speaker and the vehicle microphone is not operational,
    wherein the central controller performs voice call using a speaker and microphone of the terminal after the role change is completed,
    wherein the role change is an operation of exchanging functions of the AVN and the terminal with each other such that the AVN operates as an audio gateway (AG) and the terminal operates as the HF.

11. The AVN according to claim 10, wherein the central controller detects that the car accident occurs upon receiving an automatic crash notification (ACN) signal or an SOS (save our ship) signal.

12. The AVN according to claim 10, wherein:
    the central controller determines whether a terminal Bluetooth-paired with the AVN is present in response to the determination that the at least one of the vehicle speaker and the vehicle microphone is not operational; and
    the local area communication module release the pairing and performs the role change in response to a determination that the paired terminal is present.

13. The AVN according to claim 12, wherein:
    the local area communication module determines whether a peripheral terminal from which a discovery signal is detected is contained in a basic pairing list in response to a determination that the paired terminal is not present; and
    the local area communication module performs forcible pairing with the peripheral terminal in response to a determination that the peripheral terminal is contained in the basic pairing list.

14. The AVN according to claim 13, wherein the peripheral terminal on which the forcible pairing is to be performed is determined according to priority of the basic pairing list in response to a determination that a plurality of peripheral terminals are contained in the basic pairing list.

15. The AVN according to claim 13, wherein:
    the local area communication module determines whether the peripheral terminal is contained in an emergency pairing list in response to a determination that the peripheral terminal is not contained in the basic pairing list; and
    the local area communication module performs forcible pairing with the peripheral terminal in response to a determination that the peripheral terminal is contained in the emergency pairing list.

16. The AVN according to claim 15, wherein the peripheral terminal on which the forcible pairing is to be performed is determined according to priority of the emergency pairing list in response to a determination that a plurality of peripheral terminals are contained in the emergency pairing list.

17. The AVN according to claim 15, wherein the central controller transmits, to a telematics center, information indicating that the speakers and the microphones of the vehicle and the peripheral terminal are not available to be used in response to a determination that the peripheral terminal is not contained in the emergency pairing list.

18. The AVN according to claim 10, wherein the central controller transmits, to a telematics center, information indicating that voice call is performed through the speaker and the microphone of the terminal after performing the role change.

19. A vehicle comprising the AVN installed therein according to claim 10.

20. An audio, video, navigation (AVN) for providing an SOS (save our ship) service, the AVN comprising:
    a central controller for determining whether a vehicle speaker and a vehicle microphone connected to the AVN is operational and, according to a result of the determination, transmitting, to a telematics center, audio state information on whether the vehicle speaker and the vehicle microphone are operational in response to a detection that a car accident occurs; and
    a local area communication module for releasing pairing with a paired terminal and performing role change of changing the terminal to a hands-free unit (HF) in response to a determination that the at least one of the vehicle speaker and the vehicle microphone is not operational,
    wherein the central controller performs voice call using a speaker and microphone of the terminal after the role change is completed,
    wherein the role change is an operation of exchanging functions of the AVN and the terminal with each other such that the AVN operates as an audio gateway (AG) and the terminal operates as the HF.

* * * * *